United States Patent Office 3,403,074
Patented Sept. 24, 1968

3,403,074
PROCESS OF IMPREGNATING WET BOARD WITH SULFITE LIGNIN LIQUOR AND ACID
Ralph W. Emerson, Jackson, Miss., assignor to Emerite Corporation, Jackson, Miss.
No Drawing. Filed May 11, 1965, Ser. No. 454,987
1 Claim. (Cl. 162—163)

ABSTRACT OF THE DISCLOSURE

A process for treating hardboard. The board is formed by the wet process and while it is wet it is impregnated with an aqueous solution of sulfite lignin liquor and acid such as muriatic or hydrochloric followed by drying and curing of the board.

---

This invention relates to a composition and process for treating ligno cellulose or cellulose material.

A principal area of application is to hardboards. These boards are produced by the wet, semi-wet, and dry processes. The invention is also useful with the less dense composition boards, insulation boards and various wood and cellulose products.

My composition homogenizes and hardens the surface of these boards so they may be machined without commercially unacceptable fuzz or ragged edges appearing, as well as improving other physical characteristics of the product.

Recent applications and consequent upgrading of the boards have necessitated these improved characteristics. My composition works in the presence of, as well as in place of presently used additives to these boards.

As will be explained in more detail hereafter my additive is a mixture of lignin and acid.

The preferred ratio is two parts lignin liquor and one part muriatic acid dispersed in one part water. The preferred amount added to the board is 8.75 pounds per 1000 square feet. I have made boards with as little as six pounds of this preferred composition and with as much as eighteen pounds. Boards containing the lower limit of my additive are on the border line of exhibiting the improved machining characteristics. Boards containing the upper limit of additive have a tendency to become darker and more brittle due to the increased acid content of the board.

I have also used other ratios of lignin and acid. First I have made the composition minus the water. The sole effect of the water is to dilute the solution and make it less viscose and easier to handle. Next I have made the composition with equal parts of lignin and acid. In this latter composition I have varied the ratio of water from one half to equal the amount of either of the other ingredients. These latter compositions have all produced acceptable boards with only expected variations.

I have used various substitutes for muriatic acid in the additive composition and produced an acceptable board. I have used 36% hydrochloric acid which contains less impurities than 20 Baumé muriatic acid. Sulfuric acid has also been tried but this acid tended to darken the board and make it more brittle.

I have also made boards with aluminum, iron and copper sulfates. Like sulfuric acid these tend to darken and increase the brittleness of the board.

Lignins from various sources may be used although one of the cheapest is sulfite lignin. In the normal manufacture of hardboard there is considerable free lignin present, particularly in the Dorr water. The lignin in my composition will thus be in addition to the lignin already present.

The application of my composition to hardboard is described hereafter in connection with an overlay of fine fibers. The amount of overlay slurry will largely determine the depth of penetration of my composition. Thinning agents such as isopropyl alcohol may also be used to increase penetration.

I have also applied my composition to a hardboard mat which does not have an overlay and after the mat was dried the machineability of the board was equal to and the surface was very comparable to hardboard which had the special overlay treatment.

Further, I have applied my composition to a finished hardboard and after re-drying the improved machineability was again noted.

Specific example

By way of example, my invention may be used in the manufacture of wet process hardboards, such as those made by the Masonite Corporation under its well known trademark Masonite.

In that process the wood is reduced to a chip which is subjected to varying high temperatures and pressures. The pressure is rapidly released and the chip is disintegrated by the rapid expansion of its internal vapor. The fibers are mixed with water and become a slurry of about 2% solids. This water and slurry is known in the hardboard trade as Dorr water. The slurry is then passed through a refiner which mechanically reduces the remaining fiber bundles to a uniform size.

The slurry is meanwhile screened for coarse fibers and knots both of which are returned for additional refining. The slurry may be further screened to separate out the fines which are later applied as an overlay to achieve a higher quality surface for the board. This example will be further described only with relationship to the higher quality board although it is equally applicable to both.

The principal portion of the slurry is then put on the metal screen of a Fourdrinier machine. The excess water drains through the screen and is further expelled by a series of press rolls. The partially dried slurry or mat is then about 60% moisture content and perhaps five times the thickness of the ultimate board.

The previously mentioned fines portion of fibers is next overlaid on the mat. It is to this additional slurry that the composition comprising my invention is added. The fines, after additional refining, are mixed in a blending tank with Dorr water to about 2% solids. The slurry is kept slightly on the acid side with a pH of about 4.3 which may be easily adjusted by conventional means.

The composition of my additive one part by weight 20 Baumé muriatic acid; two parts sulfite lignin liquor of 60% solids and one part water. This composition has a pH of 0.8, viscosity of 6.04 centipoise at 25° C. Stormer method, 30% solids content by evaporation at 110° C. for two hours, density 9.93 pounds per gallon at 25° C., specific gravity of 1.19 at 25° C., insoluble solids trace, inert material water only, dilutability infinite, acid by titration 2.8 equivalents H+ per liter of solution.

The blending tank operation is a continuous one. My additive is metered into the slurry on a basis of 8.75 pounds per 600 pounds of slurry. The resulting pH of the slurry is 2.2. This amount of slurry is fed onto 1000 square feet of mat surface through an overlay headbox.

My invention requires no significant alteration in the conventional subsequent heat drying and humidification of the hardboard.

Results achieved

The primary improvement of the hardboard is in the machineability. These boards are now fabricated into many products which require various machining operations such as routing, grooving and shaping as well as conventional sawing. A clean edge with no fuzzing is desired and has only been achieved prior to this with other chemicals both at a higher cost and with the introduction of other problems.

One reason for eliminating this fuzz is the problem in painting. When paint is applied by a roller the fuzz comes off on the roller and prevents uniform coverage of the surface. The fuzzy edge also gives a rough and uneven edge which is both unattractive and liable to chip after drying, leaving a bare spot. The surfaces exposed by the routing or grooving are also rough although the problem is not as serious as at the edges. Various laborious operations such as machine brushing are required to eliminate this fuzz.

When these operations are performed on the boards produced with my additive no fuzz at the edge appears and the newly exposed surfaces are smoother. It is clear from comparing a board made with my additive and a board made without it that there is a change in the chemical bond between the fibers. The board has become more homogenous and less a mass of attached fibers.

The boards with my additive also exhibit about 20% less swell, 20% less moisture pickup, and 10% higher modulus of rupture, reducing the popping of surface fibers which results in a smoother finish for painting or film surface coating.

Having described my invention I claim:

1. A process for improving the machining characteristics and eliminating the fuzzing in hardboard comprising the step of impregnating the wet board during manufacture with 6–18 pounds per 1000 square feet of board of two parts by weight of an aqueous solution of sulfite lignin liquor and one part by weight of muriatic acid followed by the steps of final drying and curing of the board.

References Cited
UNITED STATES PATENTS

| | | | |
|---|---|---|---|
| 2,846,431 | 8/1958 | Goss | 162—163 X |
| 2,849,314 | 8/1958 | Goss | 162—163 |
| 3,305,435 | 2/1967 | Williston et al. | 162—163 X |

S. LEON BASHORE, *Primary Examiner.*